3,548,228
PIEZOELECTRIC CHARGING DEVICE
Georgy Ivanovich Mukhin, Leningradskoe shosse 54, kv. 46, Leonid Petrovich Kljukin, Leningradskoe shosse 54, kv. 161, Nikolai Alexeevich Shlykov, Ulitsa pravdy 3/1, kv. 28, and Boris Alexandrovich Shesterikov, Ulitsa konstantinova 34, korpus 2, kv. 14, all of Moscow, U.S.S.R.
Filed Mar. 31, 1967, Ser. No. 627,418
Int. Cl. H01v 7/00
U.S. Cl. 310—8.7               4 Claims

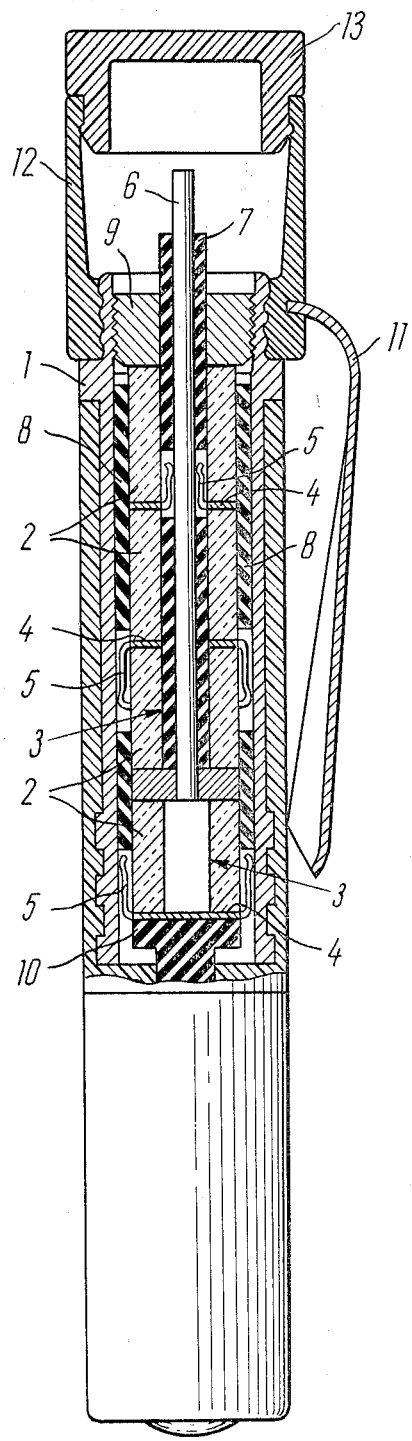

ABSTRACT OF THE DISCLOSURE

A piezoelectric charging device is provided in which a plurality of piezo elements are arranged coaxially in a surrounding body and are capable of withstanding a force applied axially thereto by which electrical charges are developed on the surfaces of the piezo elements. The piezo elements are provided with a metallized surface and are electrically connected in parallel, there being electrodes disposed between the ends of adjacent piezo elements, the electrodes having resilient contacts which are arranged such that the contacts of successive electrodes alternately contact the body which serves as a collector of negative charges and a current conducting rod serving as a collector of positive charges and passing axially in a central channel formed by coaxially disposed holes in the piezo elements and electrodes.

---

The present invention relates to piezoelectric charging devices and, more particularly, to charging devices for dosimeters, especially direct reading ones.

Presently known in the art are charging devices whose piezoelements with metallized surfaces are affected by bending forces and the electric charges thereby evolved are taken by current collectors (cf. French Pat. No. 1,231,822).

The known devices do not ensure the charging of dosimeters fitted with capacitors of over $1 \times 10^{-9}$ f.

Another disadvantage of the above devices resides in the fact that the piezoelements (plates) themselves have low mechanical bending strength which adversely affects the dependability of the charging device.

An object of the present invention is to eliminate the aforesaid disadvantages. This and other objects are achieved by the fact that in the piezoelectric charging device, according to the invention, the piezoelements are disposed coaxially and are capable of withstanding a force applied along their common axis, and are parallel-connected by electrodes provided on the metallized surfaces of said piezoelements and fitted with springs contacting the collectors.

When using the charging device for charging dosimeters, it is expedient that the electrodes be fashioned as washers disposed between the metallized ends of the piezoelements and fitted with flat springs.

It is possible to house a current conducting rod, which is the collector of positive charges, in the central channel provided by coaxially-disposed holes in the piezoelements and washers, the body of the device serving as a collector of the negative charges.

The coaxial arrangement of the piezoelements and application of force along the common central axis thereof involves a better dependability of the charging device.

The parallel connection of the piezoelements with the help of the electrodes increases the surface of current collection and ensures the charging of dosimeters of over $1 \times 10^{-9}$ f. The employment of the electrodes fashioned as washers and provided with flat springs makes the design of the piezoelement simple, whereas the provision of one of the collectors in the form of a rod housed in the central channel formed in the holes of the piezoelements and washers, makes it possible to decrease the overall dimensions of the device.

The invention will now be described in connection with an exemplary embodiment thereof and the appended drawing, showing a sectional view of the charging device according to the invention.

Coaxially arranged in a body 1 of the charging device are piezoelements 2 with metallized ends and holes 3 in the central part which form a central channel. Electrically conductive washers 4 fitted with flat springs 5 contact the metallized ends of the piezoelements 2. The central channel houses a current conductive rod 6 insulated from the piezoelements 2 and the washers 4 by tubes 7. The piezoelements 2 are insulated from the body by a tube 8. Fixation of the position of the piezoelements 2 and the electrically conductive washers 4 in the body 1 is effected by a nut 9.

The device comprises also a mechanical booster (not shown in the drawing) providing the force directed along a axis which is perpendicular to the ends of the elements 2, and a bush 10 to transfer the force to the piezoelements 2.

The body of the device is provided with a holder 11 to be fastened to a pocket of a shirt or jacket or the like, a cap 12 to be connected to the dosimeter, and a plug 13.

The present charging device operates in the following way.

By rotating the handle of the mechanical booster, an axial compressive force is produced which acts on the piezoelements 2 through the bush 10 in the direction of their common axis.

As a result of deformation of the piezoelements 2, a difference of potential is developed between the faces thereof.

The electric charges are collected from the ends of the piezoelements 2 with the help of the electrically conductive washers 4 serving as electrodes and are transferred through the flat contacting springs 5 to the body 1 and the current conductive rod 6, the latter two serving as current collectors to transfer a charge to the dosimeter.

The employment of the device of the invention is advantageous both economically and technically, for it ensures a high dependability, long service and storage life, the possibility of employing various types of dosimeters, as well as makes it possible to dispense with short-lived power sources (batteries).

What is claimed is:
1. A piezoelectric charging device adapted for charging dosimeters, said device comprising a hollow tubular body constituting a collector of negative electrical charges; a piezoelectric transducer in said body including a current conducting rod arranged in said body along the longitudinal axis thereof and constituting a collector of positive electrical charges, and disk piezoelectric elements surrounding and extending axially along said rod; electrodes in contact with opposed surfaces of adjacent piezoelectric elements; spring-loaded contacts electrically connecting said electrodes to the collectors to provide parallel connection of the piezoelectric elements to said collectors; said contacts having first end connected to said electrodes and second ends in contact with respective collectors; and means on said body coaxial with said transducer and coupled therewith for applying axial mechanical force thereto to produce electrical charges on the surfaces of the piezoelectric elements which are transmitted through the electrodes and contacts to said collectors, the latter being adapated for connection with respective current receiving elements of the device to be charged.

2. A device as claimed in claim 1, wherein the electrodes are constituted as electrically conductive planar washers arranged between opposite ends of adjacent piezoelements, said contacts including flat springs integral with said washers.

3. A device as claimed in claim 1, wherein said electrodes comprise planar washers engaged between opposite ends of adjacent piezoelements, said piezoelements and washers having coaxially arranged holes defining a central channel for said rod, said contacts being resilient members integral with said washers and extending therefrom axially of the piezoelements, the resilient members of successive washers alternately contacting said rod and body.

4. A device as claimed in claim 3, comprising tubular insulators between said piezoelements and said rod and body.

References Cited

UNITED STATES PATENTS

| 3,368,086 | 11/1965 | Libby | 310—9.1 |
| 2,988,728 | 6/1961 | Marlow | 310—8.6 |
| 3,268,855 | 8/1966 | Hagey | 310—8.2 |
| 3,379,901 | 4/1968 | Richards | 310—9.1 |
| 3,390,287 | 6/1968 | Sonderegger | 310—8.7 |
| 2,573,168 | 10/1951 | Mason | 310—9.6 |
| 2,711,646 | 6/1955 | Mendouse | 310—8.7 |
| 2,945,208 | 7/1960 | Samsel | 340—10 |
| 3,309,654 | 3/1967 | Miller | 340—10 |
| 3,336,807 | 8/1967 | Van Lint | 310—8.7 |
| 3,353,150 | 11/1967 | Jacox | 340—10 |
| 2,927,285 | 3/1960 | Curren et al. | 310—9.4X |
| 2,814,741 | 11/1957 | Minnich et al. | 310—9.4X |

MILTON O. HIRSHFIELD, Primary Examiner

B. A. REYNOLDS, Assistant Examiner

U.S. Cl. X.R.

310—9.1, 9.7